United States Patent
Bonhaus et al.

(10) Patent No.: US 7,474,876 B2
(45) Date of Patent: Jan. 6, 2009

(54) DEVICE FOR THE PRODUCTION OF STANDARD-COMPLIANT SIGNALS

(75) Inventors: Jörg Bonhaus, Hilden (DE); Thomas Duda, Duisburg (DE); Lajos Gazsi, Düsseldorf (DE); Peter Gregorius, München (DE)

(73) Assignee: Infineon Technologies AG, Munich (DE)

( * ) Notice: Subject to any disclaimer, the term of this patent is extended or adjusted under 35 U.S.C. 154(b) by 881 days.

(21) Appl. No.: 10/916,776

(22) Filed: Aug. 12, 2004

(65) Prior Publication Data

US 2005/0090203 A1  Apr. 28, 2005

(30) Foreign Application Priority Data

Aug. 12, 2003 (DE) .............................. 103 37 084

(51) Int. Cl.
*H04B 17/00* (2006.01)
*H03C 1/62* (2006.01)

(52) U.S. Cl. ............... 455/67.11; 455/115.1; 455/226.1

(58) Field of Classification Search ............. 455/67.11, 455/115.1, 226.1, 114.2, 114.3; 327/172, 327/173, 174; 370/514; 714/699, 712
See application file for complete search history.

(56) References Cited

U.S. PATENT DOCUMENTS

| | | | | |
|---|---|---|---|---|
| 5,148,434 A | * | 9/1992 | Richardson | ................. 714/712 |
| 5,264,958 A | * | 11/1993 | Johnson | ...................... 710/315 |
| 5,430,659 A | * | 7/1995 | Miller | .......................... 702/124 |
| 6,538,465 B1 | | 3/2003 | Demone | |
| 6,845,083 B2 | * | 1/2005 | Mollenkopf et al. | ........ 370/215 |
| 7,323,945 B2 | * | 1/2008 | Cyr et al. | ....................... 331/16 |
| 2002/0097808 A1 | | 7/2002 | Gregorian et al. | |
| 2003/0100277 A1 | * | 5/2003 | Takeda et al. | ................. 455/91 |

FOREIGN PATENT DOCUMENTS

| | | |
|---|---|---|
| DE | 40 11 238 A1 | 10/1991 |
| DE | 198 01 138 A1 | 7/1999 |
| DE | 101 58 779 A1 | 6/2002 |

* cited by examiner

*Primary Examiner*—Sonny Trinh
(74) *Attorney, Agent, or Firm*—Maginot, Moore & Beck

(57) ABSTRACT

A device for the production of standard compliant signals, for example pulse-type signals in a telecommunication network, serves the production and adaptation and/or pre-distortion of signals with a certain signal form, which is defined dependent on a standard signal form specified in a standard. The device comprises signal generation means (10) for the production of the signals with a certain signal form and signal adjustment means (20) for the adaptation or pre-distortion of the signals. The signal generation means (10) according to the invention are digitally realized, by using a programmable shift register (14), which contains multipliers specified by the standard signal form for multiplication with a digital input signal (1). The signal adjustment means (20) comprise substantially scalable digital filter arrangements in the form of a serial connection of digital filters (22) with a downstream multiplexer (24). Moreover, the invention provides attenuating means (50) for attenuation of the signal dependent on the characteristics of the telecommunication channel.

19 Claims, 2 Drawing Sheets

DEVICE FOR THE PRODUCTION OF STANDARD-COMPLIANT SIGNALS

The invention relates to a device for the production of standard-compliant signals, particularly for the production of pulse-type signals corresponding to a standard in telecommunication networks.

BACKGROUND

When signals are transmitted via telecommunication channels from a transmitter to a receiver, signals, in the form of pulses for example, which convey digital data bits, are fed at the transmitter end to a telecommunication channel. In the case of cable-supported telecommunication networks, the telecommunication channel is realized by a cable connection. While the signals are being propagated in the telecommunication channel changes of the signal form generally occur, for example due to frequency-dependent attenuation characteristics of the telecommunication channel. In order to permit normal processing of the signals at the receiver end, it is essential that the signals conveyed by the telecommunication channel have not only sufficient signal strength, for example pulse height, but also that the signal form corresponds to certain criteria. The criteria, for example of pulse width or flank steepness, which such a signal has to meet, can be specified in the context of a standard, for example ITU G.703, ANSI T1.403, FCC68 or FTZ 221. Therefore a device is required at the transmitter end, which produces signals in such a manner that the signals conveyed by the telecommunication channel have a certain signal form, which corresponds to a standard signal form specified by the standard. It is possible to reduce cross modulation of adjacent telecommunication channels by pre-distorting the signal form of the signal produced according to the characteristics of the telecommunication channel, for example the cable length, and in attenuation of the signal. Sometimes even adaptation of the attenuation is necessary, as a function of the cable length for example. The attenuation takes place, in order to reduce said cross modulation from adjacent telecommunication channels. The pre-distortion takes place so that at a receiver end a wrong cable length is not concluded through evaluation of the received signal on the basis of its attenuation.

Conventionally, the various signal forms and the adaptation or pre-distortion of the signals, in order to take the characteristics of the telecommunication channel into consideration, are realized by means of analog circuits.

Problems with the analog production and adaptation of the signals exist for example in a large surface area, which is required for implementing the circuits on a semiconductor chip, costly portability to other technologies and high time expenditure for testing and trimming the circuits during manufacture.

The object of the present invention is to make a device available for the production of standard-compliant signals, which solves the problems indicated above at low manufacturing cost, whereby the signals with a certain signal form are to be produced particularly by very simple and therefore robust ways and means.

SUMMARY

The above described object, as well as other objects, are achieved according embodiments of the invention.

In accordance with the present invention, signals with a certain signal form, which is defined dependent on a specified standard signal form, are produced and/or adapted or pre-distorted by means of digital circuits. For this purpose, the device according to the invention comprises signal generation means and signal adjustment means.

The signal generation means for the production of the signals with the certain signal form according to the invention are digitally realized, by using a programmable shift register, which contains multipliers specified by the standard signal form for multiplication with digital input signals, whereby the multipliers are cyclically moved by the shift register.

The signal adjustment means or pre-distortion means according to the invention are digitally realized and comprise at least one digital filter, advantageously however scalable digital filter arrangements in the form of a serial connection of several digital filters with a downstream multiplexer. The serial connection comprises taps on the output of each filter, which are connected to the downstream multiplexer, so that for example dependent on the desired signal adaptation of the telecommunication channel the necessary signal adjustment or distortion characteristic can be achieved. The output signal of the multiplexer is transformed by means of a D/A converter into an analog signal and sent via a transmission amplifier or line driver to the telecommunication channel.

Moreover, the invention provides attenuating means for attenuation of the signal dependent on the characteristics or the desired signal adaptation of the telecommunication channel. The attenuating means can be realized in both a digital as well as an analog way.

The advantage of the digital configuration of the signal generation means and signal adjustment means firstly lies in simple feasibility of the circuits, preferably on a single semiconductor chip, with considerable surface area saving compared to the analog configuration, which can be achieved due to the use of the digital technology. Digital circuits in addition are distinguished by simple portability to other technologies and therefore permit recycling of a once single-use circuit, which leads to significant cost savings. The costly and time-intensive production tests usual with analog circuits due to technological variations in manufacture can be replaced in the case of digital circuits with purely structural tests, for example "automatic test pattern generation" tests, and built-in self checks, which result in considerable test time saving as a further advantage of the digital configuration.

The aforementioned advantages also arise in the case of a digital configuration of the attenuating means. The attenuation in accordance with the present invention can take place adapted to the characteristics of the telecommunication channel, by configuring the digital filters of the signal adjustment means in such a manner that they also contain an attenuating function, so that the attenuating means are functionally integrated into the signal adjustment means. A particular advantage of this common realization of the signal adjustment means and attenuating means in the form of a serial connection of digital filters lies in the simple form of the entire circuit.

In accordance with the present invention the attenuation can also take place in an analog way. An advantage of an analog configuration of the attenuating means lies in the optimum utilization of the dynamic range of the D/A converter, which is fed with a standardized signal pre-distorted by the upstream digital signal adjustment means.

The invention is particularly suitable for the production of standard-compliant pulses for telecommunication networks, but is not limited to this preferred scope of application.

Further advantages of the present invention will be evident from the explanation of preferred or advantageous embodiments, which is given below with reference to the drawings.

DETAILED DESCRIPTION

Figure 1:
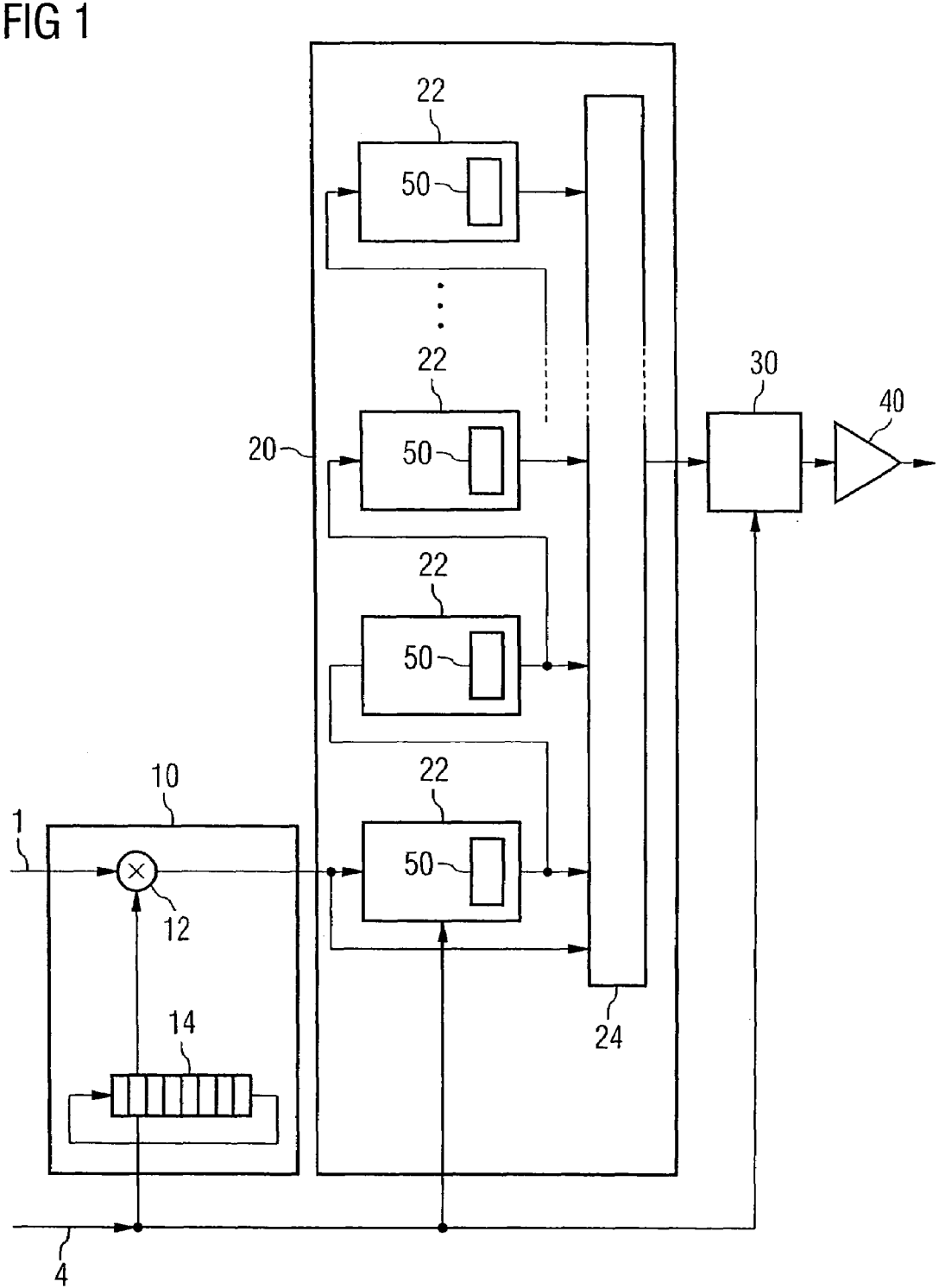
FIG. 1 schematically shows the structure of a device for the production of standard-compliant signals in accordance with an embodiment of the present invention, whereby attenuating means are digitally realized as a functional part of the signal adjustment means, FIG. 2 schematically shows the structure of a device for the production of standard-compliant signals in accordance with a further embodiment of the present invention, whereby the attenuating means are configured in an analog way and a D/A converter is connected downstream.
Figure 2:
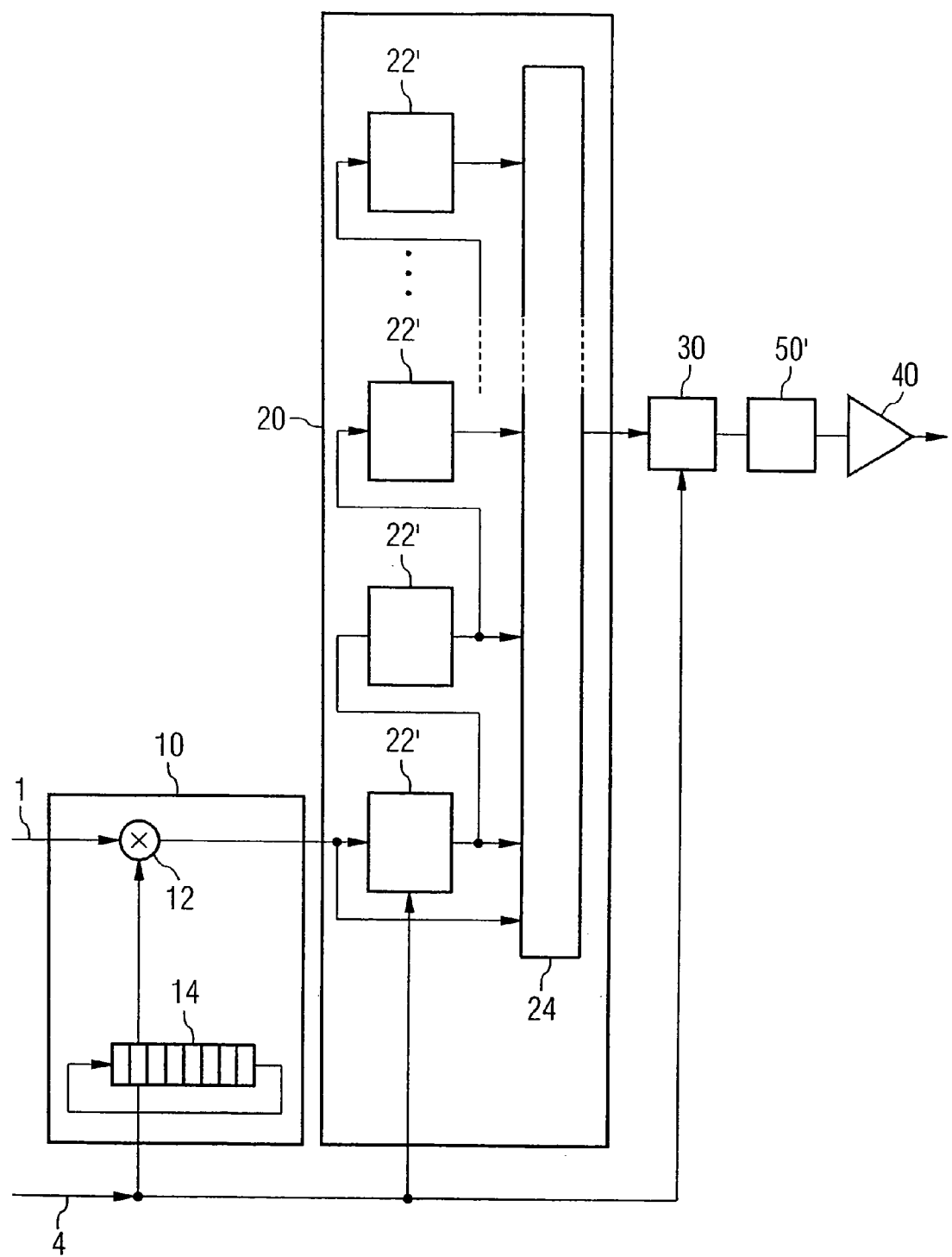

A device for the production of standard-compliant signals, in telecommunication networks for example, as illustrated in FIG. 1 and FIG. 2, comprises signal generation means 10, which produce the signals with a certain signal form and signal adjustment means 20. The signal generation means 10 and the signal adjustment means 20 are configured in such a manner that the signals produced by the device have a certain signal form, which according to the transmission through a telecommunication channel corresponds to a standard signal form specified in a standard. Both the signal generation means 10 and the signal adjustment means 20 in the case of the embodiments illustrated in FIG. 1 and FIG. 2 are digitally configured. For sending the signal via a transmission amplifier or line driver 40 to the telecommunication channel (not shown) transformation of a digital output signal of the signal adjustment means 20 into an analog signal is provided by means of a D/A converter 30.

Firstly, the function of the signal generation means 10 is described below. The signal generation means 10 comprise a programmable shift register 14 and a multiplier 12 for multiplying the digital input signals 1 of the signal generation means 10 by a value from a shift register 14. The shift register 14 is programmed with values, which are dependent on the standard signal form. Dependent on a clock 4, a system clock of the overall system for example, the values are cyclically moved by the shift register 14. Clock 4 and cyclic movement are arranged in such a manner that the pulse width of the digital input signals 1 of the signal generation means 10, which are present for example in the form of a so-called dual rail signal with three possible levels 1, −1 and 0, is a multiple of the duration of a clock unit of the clock 4. In this way, an input signal pulse can be sub-divided into several intervals, and a specified signal form can be simulated by means of the values contained in the shift register 14. The accuracy of the simulation depends on the number of intervals and on the dynamic range, which is defined by the maximum amount of one of the values contained in the shift register 14. The signal generation means 10, dependent on the digital input signals 1, therefore produce digital output signals having a signal form, which can be configured by means of the programmable shift register. With the pulse forms of the signals usual in telecommunication networks already quite a complex pulse mask can be achieved for production of the signals with sub-division into four intervals.

Over and above the production of a signal specified by the standard signal form, the signal form of the signal produced by the signal generation means 10 can already be configured by the above-described signal generation means 10, with sufficient knowledge of the signal form on the output of the telecommunication channel, in such a manner that a first signal adaptation to the characteristics of the telecommunication channel, for example in the form of a cable connection, takes place.

The signal adjustment means 20, as illustrated in FIGS. 1 and 2, can be realized by a scalable digital filter arrangement. For this purpose, digital filters 22, 22' are arranged in series, with taps on the outputs of the respective filters 22, 22'. With the aid of a downstream multiplexer 24, as illustrated in FIG. 1 and FIG. 2, dependent on the necessary signal adaptation or pre-distortion, for example dependent on a cable length of the telecommunication channel, one of the signals lying on the respective taps can be selectively passed on. In order to keep the complexity of the switching configuration to a minimum, it is advantageous to configure the filters 22, 22' identically. A signal adaptation to different lengths of the telecommunication channel for example can be easily and simply achieved by the multiplexer passing on the signal from a tap, which is characterised by a certain number of upstream filters 22, 22', for the signal adaptation to a certain length of the telecommunication channel, whereby the number of upstream filters 22, 22' depends on the length of the telecommunication channel. Adaptation to further characteristics of the telecommunication channel, for example attenuation characteristics, can also take place in the same way. As evident from FIG. 1 and FIG. 2, the signal produced by the signal generation means 10 can also be directly fed to the D/A converter 30, that is to say without passing a digital filter 22, 22'.

In accordance with FIG. 1 and FIG. 2 a possibility to attenuate the signals produced by the device is also provided. For this purpose attenuating means 50, 50' are used. The attenuating means 50, 50', as illustrated in FIG. 1, can be configured digitally or, as illustrated in FIG. 2, in an analog way.

With digitally configured attenuating means 50, configurable attenuation dependent on the characteristics of the telecommunication channel can be simply and easily achieved. This takes place, as illustrated in FIG. 1, by configuring the digital filters 22 of the signal adjustment means 20 in such a manner that they also contain an attenuating function, that is to say the attenuating means 50 are functionally integrated into the digital filters 22. As an advantage of this embodiment of the invention realization of the total circuit is simplified.

With analog-configured attenuating means 50', as illustrated in FIG. 2, analog attenuating means 50' are connected downstream of the D/A converter 30. In this case, since the D/A converter 30 is always fed with the pre-distorted but otherwise un-attenuated, that is to say standardized output signals of the signal adjustment means 20, advantageously optimum utilization of the dynamic range of the D/A converter 30 arises. As a result, an improved signal-noise ratio can be attained and the requirements in regard to the resolution capacity of the D/A converter 30 are reduced.

The devices illustrated in FIG. 1 and FIG. 2 can still comprise further filters or attenuating means, over and above the digital filters and/or attenuating means 22, 22', 50, 50' required for achieving the signal adaptation, pre-distortion or attenuation specified by the standard, so that additional attenuation of the signals is obtained, in order to test the sensitivity of a corresponding receiver in an efficient way.

The embodiments described above contain either exclusively digital attenuating means 50 or exclusively analog attenuating means 50'; a combination of digital attenuating means 50 and analog attenuating means 50' can however also be of advantage depending on the respective application.

The invention claimed is:

1. A device for the production of standard-compliant signals, comprising:
   a signal generator configured to produce signals with a first signal form, the first signal form defined dependent on a specified standard signal form, and
   a digital signal adjustment circuit configured to adapt the signals with the first signal form to the characteristics of a telecommunication channel intended for transmission of the signals, wherein the signal adjustment circuit comprises at least one digital filter, the at least one digital filter operable to pre-distort the signals with the first signal form.

2. The device according to claim 1, wherein the signal generator comprises a digital signal generator.

3. The device according to claim 1, wherein the signal generator is further operable to generate the signals with the first signal form as a function of digital input signals.

4. The device according to claim 1, wherein the signal generator comprises a shift register and a multiplier, the multiplier configured to multiply digital input signals by a set of values provided by the shift register, the multiplied digital input signals constituting the signals with the first signal form.

5. The device according to claim 4, wherein the shift register stores the set of values, and wherein the set of values correspond to the first signal form.

6. The device according to claim 1, further comprising an attenuator operably coupled to receive the signals with the first signal form.

7. The device according to claim 6, wherein the attenuator comprises a digital attenuator.

8. The device according to claim 1, wherein the signal adjustment circuit comprises at least two series-connected digital filters and a multiplexer, and wherein a tap on an output of each of the at least two digital filters is connected to respective inputs of the multiplexer, the multiplexer having an output selectively connectable to one of the respective inputs.

9. The device according to claim 8, wherein the at least two digital filters are substantially identical.

10. The device according to claim 8, wherein the attenuator is operably coupled between the multiplexer and the signal generator.

11. The device according to claim 10, wherein the attenuator forms a part of the at least two digital filters.

12. The device according to claim 1, further comprising a D/A converter coupled to receive adapted signals with the first signal form from the signal adjustment circuit, the D/A converter configured to generate analog output signals from the received adapted signals with the first signal form.

13. The device according to claim 12, further comprising an attenuator operably coupled to receive and attenuate the analog output signals.

14. The device according to claim 1, wherein the signal generation means is operable to produce the signals with the first signal form, the first signal form dependent on the specified standard signal form and the characteristics of the telecommunication channel.

15. The device according to claim 1, wherein the signal adjustment circuit is configured to adapt the signals with the first signal form as a function of a length of the telecommunication channel.

16. The device according to claim 1, wherein the signals with the first signal form are pulse-type signals.

17. The device according to claim 1, wherein the device is configured for production and adjustment of signals in cable-supported telecommunication networks.

18. A device for the production of standard-compliant signals, comprising:
   a signal generator configured to produce signals with a first signal form, the first signal form defined at least in part based on a specified standard signal form, the signal generator including a shift register and a digital multiplier, wherein the multiplier is configured to receive digital input signals and multiply the digital input signals by a set of values provided by the shift register.

19. A device for the production of standard-compliant signals, comprising:
   a signal generator configured to produce signals with a first signal form, the first signal form defined at least in part based on a specified standard signal form, the signal generator including a shift register and a digital multiplier, wherein the multiplier is configured to receive digital input signals and generate the signals with the first signal form by multiplying the digital input signals by a set of values provided by the shift register; and
   a signal adjustment circuit comprising a set of series-connected digital filters and a multiplexer, wherein a tap on the output of each of the set of digital filters is connected to respective inputs of the multiplexer, the multiplexer having an output selectively connectable to one of the respective inputs, and wherein the set of series-connected digital filters is operably coupled to receive the signal with the first signal form.

* * * * *